United States Patent [19]

Tokuda

[11] Patent Number: 4,479,708
[45] Date of Patent: Oct. 30, 1984

[54] TEMPERATURE COMPENSATION SYSTEM OF LIGHT MEASURING CIRCUIT

[75] Inventor: Ryuji Tokuda, Tokyo, Japan

[73] Assignee: Canon Kabushiki Kaisha, Tokyo, Japan

[21] Appl. No.: 393,303

[22] Filed: Jun. 29, 1982

[30] Foreign Application Priority Data

Jul. 7, 1981 [JP] Japan ............................ 56-106400

[51] Int. Cl.$^3$ ........................ G03B 7/083; G05F 3/08
[52] U.S. Cl. .................................. 354/427; 354/428; 354/459; 354/464; 250/214 P; 250/214 C; 250/214 L; 307/297; 307/491; 323/907
[58] Field of Search ............... 354/24, 50, 51, 60 R, 354/234, 235, 427, 428, 459–461, 464; 307/297, 307/311, 491; 328/2; 356/215, 218, 223; 250/214 P, 250/214 C, 214 L; 361/173–175, 140; 323/312, 313, 323/315, 316, 907

[56] References Cited

U.S. PATENT DOCUMENTS

| | | | |
|---|---|---|---|
| 3,952,257 | 4/1976 | Schade, Jr. ...................... | 323/315 X |
| 4,037,234 | 7/1977 | Tunekawa et al. .................. | 354/24 |
| 4,063,120 | 12/1977 | Idei ..................................... | 307/297 |
| 4,072,962 | 2/1978 | Maida ................................. | 354/24 |
| 4,100,436 | 7/1978 | Van de Plassche ............ | 323/315 X |
| 4,176,308 | 11/1979 | Dobkin et al. .................. | 307/297 X |
| 4,303,318 | 12/1981 | Kitaura et al. ...................... | 354/24 |
| 4,375,321 | 3/1983 | Suzuki et al. ..................... | 354/24 X |

OTHER PUBLICATIONS

IBM Technical Disclosure Bulletin, "Temperature Compensated Voltage Reference Source", by Chung C. Liu, vol. 14, No. 4, Sep. 1971.

Primary Examiner—William B. Perkey
Attorney, Agent, or Firm—Toren, McGeady and Stanger

[57] ABSTRACT

Disclosed is a temperature compensation system for light measuring circuits. Said system compensates for the change, over temperature, of the output of the light measuring circuit by applying a bias source with a predetermined temperature coefficient. The system is designed so the bias voltage source is derived from the $V_{BE}$ (base to emitter voltage) difference between a pair of transistors, which difference is generated by the difference of current density at the junction of the pair of transistors obtained by flowing a pair of currents with a constant ratio independent of temperature.

4 Claims, 4 Drawing Figures

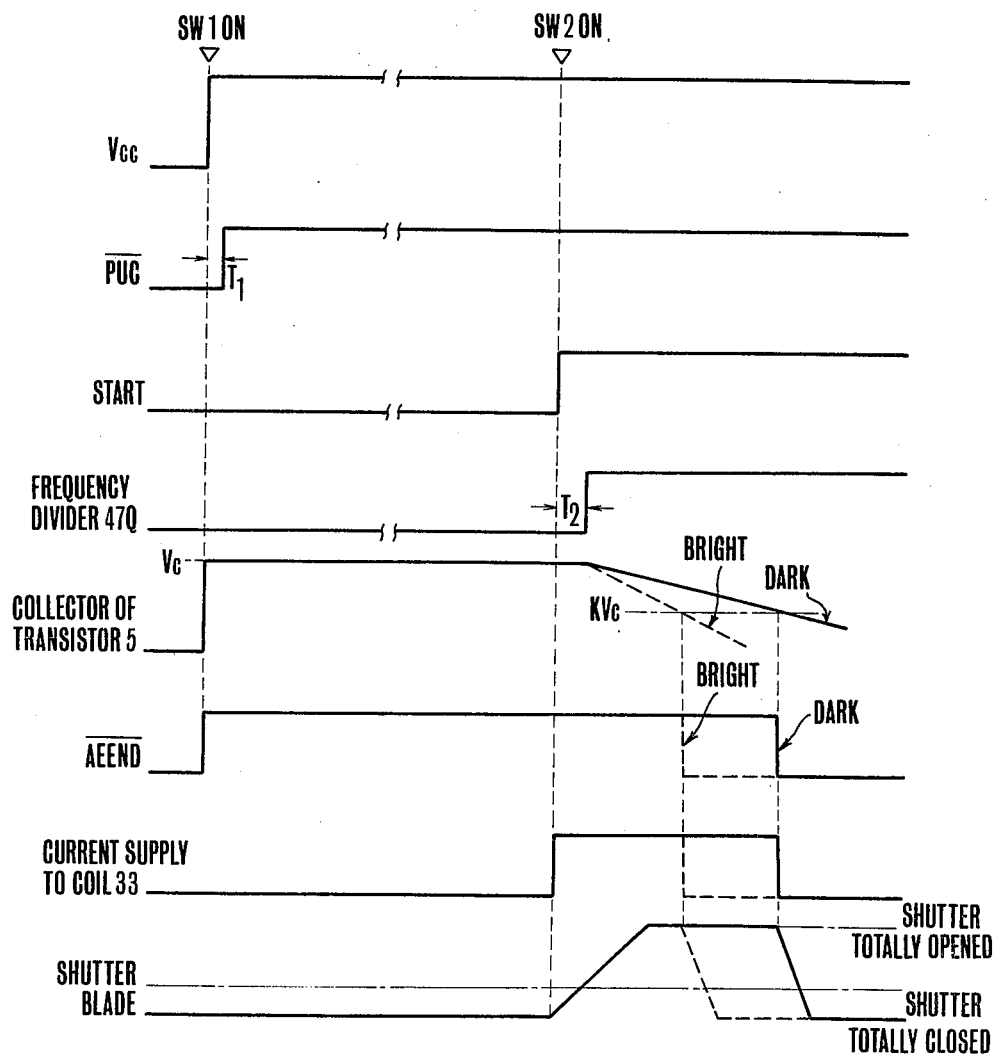

TEMPERATURE COMPENSATION SYSTEM OF LIGHT MEASURING CIRCUIT

BACKGROUND OF THE INVENTION

1. Field of the Invention

The present invention relates, in general, to light measuring circuitry for a camera and, in particular, to a temperature compensation method, suited for monolithically integrating the light measuring circuitry. In said circuitry, the photo current from a photoelectric transducing element is amplified by an operational amplifier having logarithmic compression characteristics and then expanded expotentially by means of a transistor and so on.

2. Description of the Prior Art

The technical background in this field will be explained with reference to FIG. 1. FIG. 1 shows an example of light measuring circuitry for a camera. 1 is an operational amplifier (hereinafter called OP1) having a high input impedance, for example, having MOS-FET as the input step. 2 is a photoelectric transducing element, such as silicon photo diode, connected between the non-inverting input and the inverting input of OP1 so as to produce a current $I_{SPD}$ proportional to the brightness of an object to be photographed. 3 is a logarithmic compression diode connected between the output and the inverting input of OP1 so as to constitute a negative feedback circuit. 4 is a reference voltage source having an output voltage Vref for biasing the noninverting input terminal of OP1. 5 is an expansion transistor whose base is connected to the output of OP1 and whose emitter is grounded. 6 is a timing capacitor having a capacitance C and which is connected between the collector of the expansion transistor and a power source or a constant potential 7. 8 is a count switch which is normally closed and opened in synchronization with the initial count timing when a time inversely proportional to an incident light on the light sensing element 2 should be obtained and 9 is a comparator, one input of which is connected to an almost constant potential $V_{TH}$ from 7 independent of temperature, and whose other input is connected to the collector of expansion transistor 5. In this schematic, the output voltage OP1 OUT of OP1 is represented with the characteristics of the ideal operational amplifier and the diode currentvoltage characteristics as follows:

$$(OP1 \text{ OUT}) = Vref + \frac{kT}{q} \ln \frac{I_{SPD}}{Is} \quad (1)$$

Hereby,
q: charge per electron (coulomb)
k: Boltzmann constant
Is: backward saturation current of the compression diode
T: ambient temperature expressed with absolute temperature (°k)
Vref: reference voltage
$I_{SPD}$: photo current of the light sensing element Suppose that the current flowing through expansion transistor 5 is Ic and $H_{FE}$ (the current gain) of transistor 5 is so large that the difference between Ic and Ie (emitter current) can be neglected. Then the base potential $V_{BASE}$ is represented as follows:

$$V_{BASE} = \frac{kT}{q} \ln \frac{Ic}{Is} \quad (2)$$

Hereby, Is is the backward saturation current at the base-emitter junction of expansion transistor 5. Is can be expected to be the same value and to have the same characteristics as Is in equation (1) by fabricating both compression diode 3 and expansion transistor 5 in the same monolithical way. Namely, Is in (1) becomes equal to Is in (2). Since OP1 OUT in the equation (1) is equal to $V_{BASE}$ in the equation (2), then $$Vref + \frac{kT}{q} \ln \frac{I_{SPD}}{Is} = \frac{kT}{q} \ln \frac{Ic}{Is}$$

Thus, $$Ic/I_{SPD} = \text{EXP}(q \times Vref/kT) \quad (3)$$

On the other hand, the time interval after the closed count switch 8 is opened until the timing capacitor 6 is charged, with the expansion current Ic, to $V_{TH}$ is represented as follows:

$$t = \frac{C \times V_{TH}}{Ic} \quad (4)$$

Substitution of (3) in (4) gives $$t = \frac{C \times V_{TH}}{I_{SPD} \times EXP(q \times Vref/kT)} \quad (5)$$

As is apparent from the above, in order for t to be independent of temperature and inversely proportional to the photo current $I_{SPD}$, it is necessary for the reference voltage Vref to be proportional to the absolute temperature so as to be able to eliminate the termperature term T. Even if Vref=0 in (5), t is independent of temperature and inversely proportional to $I_{SPD}$. However, $I_{SPD}$ is generally very small, so it is ordinarily necessary to obtain Ic which is amplified from $I_{SPD}$ by 1000 to 2000 times. Thus, the reference voltage Vref is often selected to be about 200 mV in order to obtain such a high amplification factor.

Consequently, in a circuit in which the light measuring or exposure control is carried out with the voltage obtained when the short circuit current of the photodiode flows through the compression diode, it is necessary to devise many means for temperature compensation which requires a voltage proportional to the absolute temperature. Whereby, for example, a resistor having a resistance almost proportional to the absolute temperature can be used. However, in this case, the cost of such a resistor is not only high, in general, but it has poor stability or linearity and then high accuracy cannot be guaranteed, which is inconvenient. In this case, another resistor with a low temperature coefficient is often needed in addition to the special resistor mentioned above, which is not suitable to monolithically integrable semiconductor circuits. Further, as is disclosed in U.S. Pat. No. 4,072,962, a constant current source whose output is proportional to the absolute temperature is designed in a manner such that a voltage proportional to the absolute temperature is obtained by letting the current flow through a resistor. Even in this case, not only does the circuit become complicated, but theoretically, resistors without temperature coefficients seem to be needed as external parts around the monolithic integrated circuit, which is also inconvenient.

SUMMARY OF THE INVENTION

Accordingly, it is an object of the present invention to provide an improved temperature compensation system for the light measuring circuit which overcomes the disadvantages of prior art devices.

It is another object of the invention to provide an improved temperature compensation system which is simple in construction, does not rely on the temperature coefficient of resistors and is suited for monolithic integrated circuits.

It is a further object of the invention to provide a temperature compensation circuit, a large part of which can be used in common with functions other than light measuring, which contributes to the size reduction of the integrated circuit.

These and further objects and features of the invention will become apparent from the following detailed description of an embodiment thereof taken in connection with the accompanying drawings.

BRIEF DESCRIPTION OF THE DRAWINGS

FIG. 3 shows a timing-chart for explaining the sequential operation of the circuit shown in FIG. 2.

DESCRIPTION OF THE PREFERRED EMBODIMENTS

Figure 1:
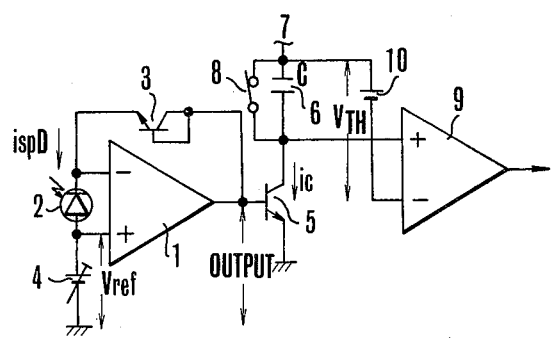
FIG. 1 shows an example of the light measuring circuit for explaining the technical background of the invention.
Figure 2:
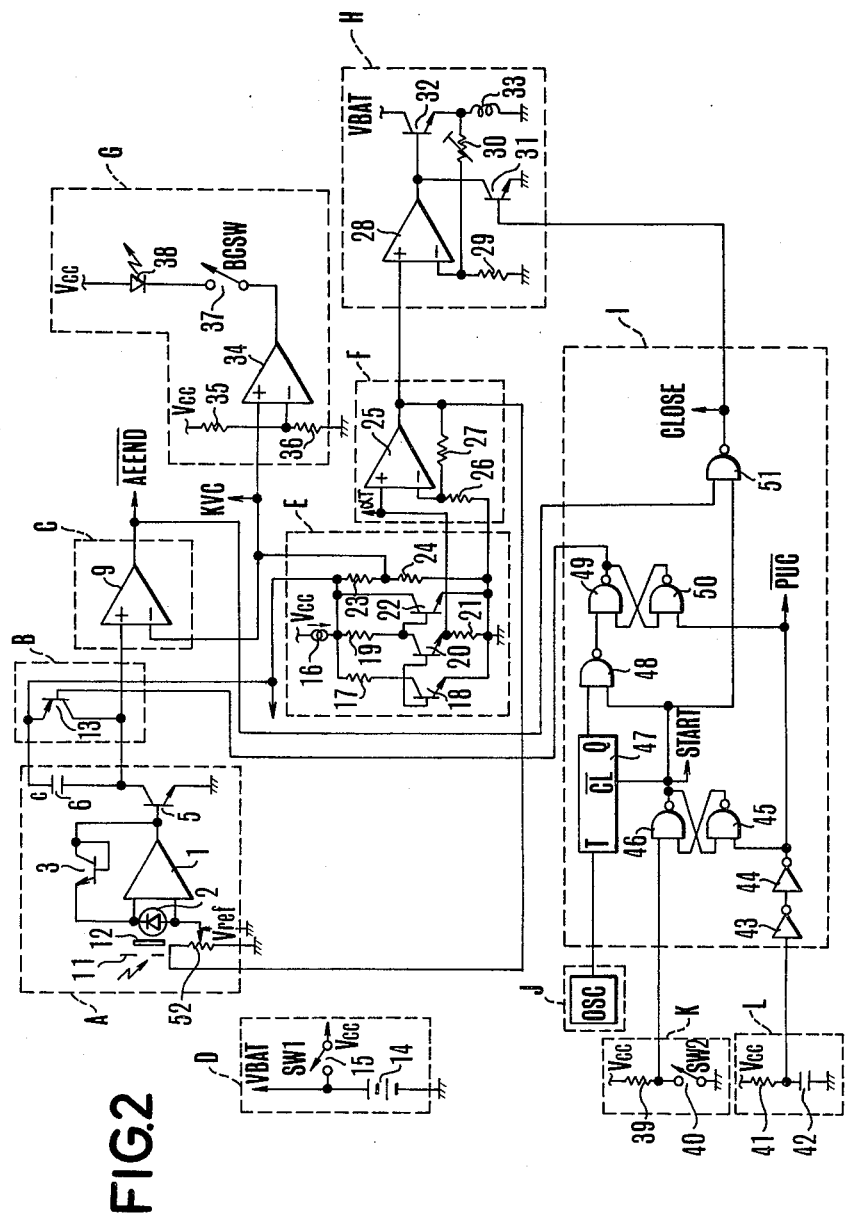
FIG. 2 shows a schematic diagram for a camera including an embodiment of a temperature compensation system according to the invention.

The present invention will be described in detail with reference to the accompanying drawings. FIG. 2 shows an embodiment of the circuit of the camera having the temperature compensation circuit according to the present invention. Block A in a dotted line is the photoelectrical transducing part, B the electric count switch part electrically carrying out the function of the count switch shown as 8 in FIG. 1, C the automatic exposure completion signal producing part for the final determination of the shutter speed, D the power source, E the regulator part producing various reference voltages, F the buffer part amplifying a voltage, which voltage is proportional to the absolute temperature, G the battery check part, H the shutter control coil driving part, I the logic control, J the oscillator, K the release signal producing part and L the PUC producing part, for producing a signal (hereinafter called PUC signal) which resets the flip-flop and so on when the power source is connected. In blocks A and C, the elements having the same figures as those in FIG. 1 are the same elements and therefore any further explanation is omitted here. 52 is a variable resistor for the automatic exposure level adjustment, one end of which is grounded, and the other end of which is connected to the output of operational amplifier 25 of block F, to be explained later, and whose slide terminal is connected to the non-inverting input of operational amplifier 1 so as to deliver the bias voltage Vref shown as 4 in FIG. 1. 11 is a sensor aperture, such as an auxiliary diaphragm, arranged in front of the light sensing element and 12 is a filter for inputting the ASA information and so on. In the present embodiment, timing capacitor C shown as 6 in FIG. 1 is connected to a potential 7 and to a potential VC which is an output of block E. The mechanical count SW shown as 8 in FIG. 1 consists of PNP transistor 13, whose emitter is connected to said VC, and whose collector is connected to the connecting point of timing capacitor 6, the collector of transistor 5 and the non-inverting input of comparator 9. The base of transistor 13 is connected to NAND gate 49 in block I. The inverting input of comparator 9 is connected to KVC, which is the divided voltage of VC, and to resistors 23 and 24, and its output is connected to the one input of NAND gate 51. This output is the $\overline{AEEND}$ signal whose level is changed from "H" to "L" when the automatic exposure has been completed. 14 is a power source having a voltage $V_{BAT}$ and producing a voltage VCC via switch SW1 15 to be closed, in operative engagement, with the first stroke of the shutter button (not shown in the drawing), whereby VCC is connected to each circuit element whose power source is not particularly shown in FIG. 2. In block E, 16 is a current source positioned between VCC and VC in order to supply a current to the circuit consisting of elements 17-24. One end of resistor 17 is connected to VC and the other end is connected to the connecting point of the base of transistor 20, the collector of transistor 18 and the base of transistor 18. The emitter of transistor 18 is grounded. The collector of transistor 20 is connected to VC, via resistor 19, and also to the base of the transistor 22. The emitter of transistor 20 is grounded, via resistor 21, and is also connected to the non-inverting input of the operational amplifier 25. The collector of transistor 22 is connected to VC and the emitter is grounded. The inverting input terminal of operational amplifier 25 is connected to the output via feedback resistor 27 and grounded via resistor 26, hereby amplifying the potential $\alpha T$ across resistor 21 with the following gain.

$$\frac{(\text{resistance of 26} + \text{resistance of 27})}{(\text{resistance of 26})}$$

The output is connected not only to the one end of variable resistor 52 but also the non-inverting input of operational amplifier 28. Operational amplifier 28 is provided with transistor 32 for controlling a relatively large current. Namely, the base of transistor 32 is connected to the output of operational amplifier 28, the collector to $V_{BAT}$ and the emitter is connected to coil 33, for driving shutter blades, whose other end is grounded and is also connected to variable resistor 30 whose other end is connected to the inverting input of operational amplifier 28 so as to form a negative feedback loop. Said inverting input of operational amplifier 28 is grounded via resistor 29. Hereby, a voltage across coil 33 is kept constant when transistor 31, whose collector is connected to the base of transistor 32, is in the open state. Namely, the voltage across the coil 33 is to be (the output voltage of the amplifier 25) ×

$$\frac{(\text{resistance of 29} + \text{resistance of 30})}{(\text{resistance of 29})}$$

The emitter of transistor 31 is grounded and the base is controlled by the output signal CLOSE of NAND gate 51. The non-inverting input of comparator 34 is connected to KVC to the inverting input the divided voltage of VCC and resistors 35 and 36 is supplied so as to constitute a battery check circuit which lights display LED 38 when the power source voltage is higher than a predetermined value in conjunction with battery check switch BCSW 37 being closed. Although not shown in the drawing, it is desired that switch BCSW is designed to close switch SW1 when it closes. 40 is the switch (hereinafter called SW2) to be closed with the second stroke of the shutter button (not shown in the drawing) so as to transmit the will "Release" of the photographer to the circuit, whereby one end of the switch is grounded and the other end is connected to pull up resistor 39, so that the connection is made to NAND gate 46. One end of resistor 41 is connected to the power source VCC and the other end to capacitor 42, the other end of which capacitor is grounded, and the junction of 41 and 42 is connected to the input of the inverter gate 43. The output of the oscillator OSC in block J is connected to input T of frequency divider 47. The output of inverter gate 43 is supplied to inverter gate 44 whose output is delivered to the input of NAND gates 45 and 50 as the $\overline{PUC}$ signal. The level of the $\overline{PUC}$ signal is "L" for a predetermined period of time after switch SW1 is closed. The output of NAND gate 46 is connected to the input of NAND gate 45, whose output is connected to the input of the NAND gate 46 so as to constitute an R - S flip-flop. The output of NAND gate 46 is also delivered to the clear input $\overline{CL}$ of said frequency divider 47, one input of NAND gate 48 and one input of NAND gate 51 as the start signal for holding the "H" level when switch SW2 is closed once. Further, the other input of NAND gate 48 is connected to the Q terminal, the output of frequency divider 47, while the output of NAND gate 48 is connected to one input terminal of NAND gate 49. The output of NAND gate 49 is connected to the input of NAND gate 50, whose output is connected to the input of NAND gate 49 so as to constitute an R - S flip-flop.

The operation of the above circuit will be explained. The entire circuit is supplied with power only when switch SW1 is closed. The principle on which the regulator in block E produces the voltage $\alpha T$ which voltage is proportional to the absolute temperature and the voltages VC and KVC, independent of temperature, will be explained. Suppose that the values of the resistors 17, 19 and 21 are R1, R2 and R3 respectively and that 18, 20 and 22 are preferably transistors with equal characteristics. Because the collector of transistor 18 is connected to the base, the potential of the collector is $V_{BE}$ (base to emitter voltage).

Because the collector of transistor 20 is connected to the base of the transistor 22, its potential is also $V_{BE}$, namely, the potential of the collectors of transistors 18 and 20 is almost equal. One end of resistor 17 and one end of resistor 19 is connected to the common potential VC so that the ratio of the current I1 flowing through transistor 18 via resistor 17 to the current I2 flowing through transistor 20 via resistor 19 is R2:R1. Then the potential $\alpha T$ across resistor 21 is represented as follows:

$$\alpha T = (V_{BE} \text{ of the transistor } 18) - (V_{BE} \text{ of the transistor } 20)$$

$$= \frac{kT}{q} \ln \frac{I1}{Is} - \frac{kT}{q} \ln \frac{I2}{Is}$$

$$= \frac{kT}{q} \ln \frac{I1}{I2}$$

$$= \frac{kT}{q} \ln \frac{R2}{R1}$$

For this equation, q, k, T, and Is are the same as for equation (1). Therefore, the value R2/R1 can be expected to be uninfluenced by temperature so that $\alpha T$ is proportional to the absolute temperature. When R2/R1 is selected to be 10, about 60 mV can be obtained at 25° C. Although, in principle, the absolute value R2/R1 is made larger, this is not profitable because the accuracy of the ratio as well as the temperature characteristics of the resistor become inferior when the resistor ratio is made large in a monolithic IC. Further, this circuit is generally used as the band gap regulator circuit in order to obtain stable voltages independent of the fluctuations of power source voltage and temperature. The reason why VC and the power source voltage are stable over temperature in the present embodiment will be explained in the following. The reference voltage VC of the block E is represented as follows:

VC = ($V_{BE}$ of the transistor 22) + (Voltage across the resistor 19).

When $H_{FE}$ of transistor 20 is considered sufficiently large, the voltage across resistor 19 can be given by:

$\alpha T$: Voltage across the resistor $21 \times \frac{R2}{R3}$.

Therefore, $$VC = (V_{BE} \text{ of the transistor } 22) + \frac{R2}{R3} \cdot \frac{kT}{q} \ln \frac{R2}{R1}$$

The potential $V_{BE}$ of transistor 22 in the first term is generally about 600 mV–700 mV with a negative temperature coefficient of about −2 mV/°C.

Consequently, if R1, R2 and R3 are selected in such a manner that the absolute value of the second term, at room temperature (25° C.), is the same as that of the first term, namely 600 mV–700 mV. The positive temperature coefficient of +3356 ppm/°C. (explained later) is that the latter is proportional to the absolute temperature, as shown in the following:

+3356 ppm/°C. × 600 mV = +2 mV/°C.

As mentioned above, the negative temperature coefficient of the first term is compensated by the positive temperature coefficient of the second term in such a manner that the reference voltage of about 1.2–1.3 V, which does not depend on temperature, can be obtained.

The relation between the voltage, proportional to the absolute temperature, and the temperature coefficient will be explained in the following.

The temperature coefficient is generally defined as follows:

$$\text{Temperature coefficient} = \frac{\frac{(\text{Value at the room temperature } t = 25° \text{ C.}) - (\text{Value at } t = t_1° \text{ C.})}{(\text{Value at the room temperature } t = 25° \text{ C.})}}{(25° \text{ C.} - t_1)}$$

Thus, when α is taken as the proportional coefficient and T is taken as (273° C.+t° C.), the temperature coefficient of the voltage proportional to the absolute temperature is represented as:

(Temperature coefficient being proportional to the absolute temperature)

$$= \frac{\frac{\alpha \times (25 + T) - \alpha \times (t_1 + T)}{\alpha \times (25 + T)}}{25 - t_1}$$

$$= \frac{\frac{\alpha \times (25 + 273) - \alpha \times (t_1 + 273)}{\alpha \times (25 + T)}}{25 - t_1}$$

$$= \frac{1}{298} = 3356 \text{ ppm/°C.}$$

Consequently, the voltage αT, which is proportional to the absolute temperature, has the temperature coefficient of 3356 ppm/°C.

Namely, the absolute value of VC is about 1.2–1.3 V (band gap voltage of silicon), which has no dependency upon temperature. In the case of the present embodiment, timing capacitor 6 is connected to VC and the inverting input of comparator 9 is connected to KVC which is given by dividing VC with the resistors 23 and 24 and can also be expected to be stable over temperature and power source fluctuation. Therefore the $V_{TH}$ in FIG. 1 is represented by VC−KVC, which is independent of temperature and power source fluctuation. Further, because KVC is used as the reference input for battery checking, a stabilized battery check function can be obtained. Namely, in block G, the power source voltage divided with resistors 35 and 36 is delivered to one input of comparator 34, while KVC is delivered to the other input, as the reference input, which is stable over the change of temperature in such a manner that it can be judged whether the power source voltage is sufficient for driving the other circuit by comparing the voltages. In the case of the present embodiment, KVC is used as the reference input but it goes without saying that VC also will do. If VCC is larger than the value expressed by, (the resistance of 35+the resistance of 36)×KVC/(the resistance of 36), the comparator 34 produces the "L" level signal, whereby LED 38 displays when switch BCSW is closed. In the present embodiment, the battery check function is shown as an example of how such a stable reference voltage, as VC or KVC, is very useful. It is well known that the existence of such a reference voltage would make it easy to design a camera electrical system, so it goes without saying that the application is not limited to that of the present embodiment.

The voltage αT which is proportional to the absolute temperature is amplified by the amplifying part F up to a proper voltage without losing the property of the proportionality to the absolute temperature. The output of the block F is used as the bias source Vref for the temperature compensation and for amplifying the photo-current in the photoelectric transducing part A. It may be said that the value of variable resistor 52 should be chosen to be so small that the photoelectric current flowing through the light sensing element 2 is, as compared with the current normally flowing through resistor 52, sufficiently small to be neglected. On the other hand, the output of block F is also delivered to block H so as to drive coil 33 in a magnetic field by applying a voltage proportional to the absolute temperature across the coil. The shutter blades (not shown) are opened and closed by the force generated between the magnet field and the coil current. The merit for such a use has been disclosed in the patent application (based on Japanese patent application No. Sho 56-82670) by the same applicant as that of the present application. The merits of Vref proportional to the absolute temperature in block A has been explained in accordance with FIG. 1 so that the explanation is omitted here.

The sequential operation of the present embodiment will be explained with reference to the sequence timing chart in FIG. 3. When switch SW1 is closed, every circuit is actuated. At the same time, capacitor 42 starts charging via resistor 41 in such a manner that a positive pulse having a predetermined width is delivered from inverter 43. The pulse width is determined by the time constant of resistor 41 and capacitor 42 and also by the threshold voltage of inverter 43. This pulse is inverted by inverter gate 44, which puts out a $\overline{PUC}$ pulse which has a negative sign for a predetermined period after the switchon of the power source, so as to reset the R-S flip-flop. As a result, the output of NAND gates 46 and 49 is reset and latched in the "L" level. The START signal of gate 46 brings frequency divider 47 into the non-operative state to put out an "L" level at Q and the START signal is also supplied to NAND gate 48 so it puts out an "H" level. With the "L" level of the output of NAND gate 49, transistor 13 is brought into the operative state which short-circuits the timing capacitor 6 so as to prepare for the exposure control operation. At this time, the noninverting input of comparator 9 is about VC and the inverting input is KVC, so that $\overline{AEEND}$ is an "H" level output, while NAND gate 51 delivers an "H" level output because the one input START is in the "L" level. Therefore, transistor 31 is brought to the on state making transistor 32 non-operative and preventing current supply to coil 33. When switch SW2 is closed by the second stroke of the shutter button, an "L" level is supplied to NAND gate 46, whose output, START, is turned to the "H" level and latched. With the change of the START signal to "H", frequency divider 47 is supplied with the output from OSC so as to start the frequency dividing operation. At this time point, the output of NAND gate 48 keeps the "H" level even though the one input of NAND gate 48 is charged from "L" to "H", since the Q output of frequency divider 47, which is the other input of NAND gate 48, keeps an "L" level for a predetermined period T2 after this time point. On the other hand, the output of NAND gate 51 is changed from "H" to "L" so as to start the current supply to coil 33 and to open the shutter blades, because one input, START, of NAND gate 51 is turned to "H" while the other input $\overline{AEEND}$ keeps the "H" level. Frequency divider 47 is designed in such a manner that the Q output is turned to "H" at a predetermined time point during the opening of the shutter blades, for example, when the auxiliary diaphragm is brought out of the pre-opened state into the totally closed state. Then the output of NAND gate 48 is "L" because the two inputs become "H", and the outputs of NAND gate 49 is turned and latched in "H". Thus, transistor 13 is brought into the off state and timing capacitor 6 starts to be charged with the expansion current, which is proportional to the light incident on the light sensing element, this is the so-called shutter speed determining operation for controlling automatic exposure. As was clearly explained before, the voltage across the timing capacitor reaches a level (VC−KVC), after a time inversely proportional to the expansion current which is proportional to the light incident on the light sensing element, when the output $\overline{AEEND}$ of comparator 9 is changed from "H" into "L". Thus, the output of NAND gate 51 is again turned to "H" so as to bring transistor 31 to the on state, transistor 32 to the off state and to stop the current supply to the coil, therefore, the shutter blades start to close.

As is explained above, for the present embodiment, a shutter time inversely proportional to the light incident on the light sensing element can be obtained free from influences caused by changes of the power source voltage and temperature. Further, in this specification, the operation of the shutter blades by the electromagnetic force and the automatic exposure control operation with the auxiliary diaphragm are not explained in detail. However, there are many references to prior art in those technical fields and, in most cases, what is required for the light measuring circuit is to always supply an accurate time, inversely proportional to the light incident upon the light sensing element. Therefore, it goes without saying that even if the explanation for said operations is omitted here, it does not affect the substance of the present invention.

In other words, the substance of the present invention lies in the improvement of the system which controls the movement of the shutter blade through an electromagnetic member, such as a solenoid, by using a photoelectric element, such as a silicon photodiode, to determine the exposure time by compression and expansion. The substance of the invention is not limited by the concrete driving mechanism of the shutter blades or the method for controlling the light incident upon the light sensing element.

Further, in the case of the present embodiment, a count switch is electrically opened at a predetermined timing after release, because the electromagnetic force for driving the shutter blades may be too weak to operate the mechanical count switch. However, the count switch can also be opened by detecting the movement of the auxiliary diaphragm by monitoring the change of the incident light which passes through the diaphragm so as to electrically determine the timing of the count switch.

Figure 4:
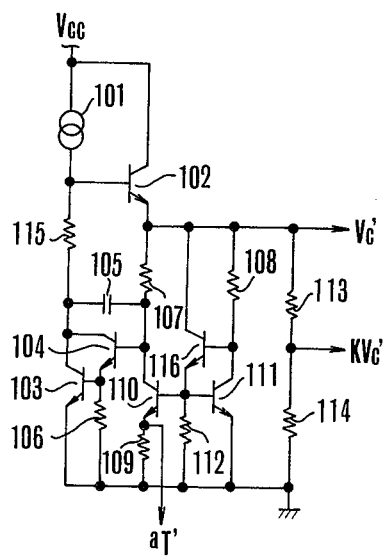
FIG. 4 shows another embodiment of the circuit of the temperature compensation system according to the invention.

It is also possible to change block E in FIG. 2 within the substance of the invention as follows. FIG. 4 shows another embodiment of the temperature compensation system according to the present invention.

In the drawing, 101 is a current source, one end of which is connected to the power source, VCC, and the other end of which is connected to the base of transistor 102. One end of resistor 115 is connected to the base of transistor 102 and the other end is connected to the collectors of transistors 103 and 104 and one end of the capacitor 105. The emitter of transistor 104 is connected to the base of 103, which is grounded via resistor 106. The emitter of transistor 103 is grounded. The collector of the transistor 110 and the one end of the resistor 107 are connected to the base of the transistor 104, the other end of capacitor 105. The other end of resistor 107 is connected to the emitter of transistor 102 and this connecting point is the output VC', to which the collector of transistor 116, one end of the resistor 108 and one end of resistor 113 are connected. If this circuit is used instead of block E in FIG. 2, it can be considered that VC' is connected to the points to which VC is connected in FIG. 2. The collector of transistor 102 is connected to VCC. The emitter of transistor 110 is grounded via resistor 109, while the base is connected to the emitter of transistor 116 and the base of transistor 111 and grounded via resistor 112. The emitter of transistor 11 is grounded, and the collector is connected to the base of transistor 116 and the other end of resistor 108. The other end of resistor 113 is grounded via the resistor 114 and the connecting point of these two resistors is the output KVC'. It can be considered that KVC' is connected to the points to which KVC is connected in FIG. 2. The operation of this circuit will be explained in the following. The difference from block E in FIG. 2 is that the value VC' in FIG. 4 is twice as large as VC in FIG. 2 if transistors having the same characteristics are used, namely, a band gap voltage twice as high as that of silicon. The basic theorem allowing voltages as described above can be represented by the following:

VC'=($V_{BE}$ of transistor 103)+($V_{BE}$ of transistor 104)+(voltage across the resistor 107).

In the above equation, the sum of the first and second terms is twice as large as $V_{BE}$, namely 2.4–2.6 V at room temperature and has a temperature variation of about −4 mV/°C., so that the voltage across resistor 107 is desired to have an absolute value of about 1.2–1.3 V and temperature characteristics proportional to the absolute temperature so as to cancel the temperature variation in the sum of the first and second terms. In more detail, the potential at the collector of transistor 110 is fixed at about $2V_{BE}$ with the stack up of $V_{BE}$'s of transistors 103 and 104. Resistors 115 and 106 almost determine the currents flowing through transistors 103 and 104 respectively. On the other hand, the potential at the collector of transistor 111 is also fixed about $2V_{BE}$ with the stack up of $V_{BE}$'s of transistors 111 and 116. Resistors 112 and 108 almost determine the currents flowing through transistors 116 and 111. Thus, each collector potential, $2V_{BE}$, of transistors 110 and 111 and its temperature change can almost be made equal. One end of resistors 107 (with a value RA) and 108 (with a value RB) is connected to VC', while the other ends are connected to the collector of transistors 110 and 111 respectively, so the ratio of the current flowing through 107 to the current through 108 is RB:RA. Thus, the voltage (hereinafter called αT) across resistor 109 (with a value RC) is represented as in the case of the explanation for block E in FIG. 2, as follows:

$$\alpha'T = \frac{kT}{q} \ln \frac{RB}{RA}$$

Thus, if it is supposed that each $H_{FE}$ of transistors 109 and 104 is large, the voltage across resistor 107 is equal to $$\frac{RA}{RC} \cdot \frac{kt}{q} \cdot \ln\frac{RB}{RA}$$

whereby RA/RC and RB/RA can be selected so that they are free from temperature dependence so that the voltage has the characteristics of being proportional to the absolute temperature. In case RA, RB and RC are selected so the temperature variation of the voltage across resistor 107 is about +4 mV/°C., as is apparent from the above equation, VC' can be made to be a stable reference voltage over temperature and the absolute value is 2.4–2.6 V. Further, when the circuit in FIG. 4 is referred to the circuit in FIG. 2, the emitter potential of transistor 110 is used as αT in FIG. 2. Further, in FIG. 4, the collector of transistors 103 and 104 is not connected to VC' but to the base of transistor 102. This means that the current supply from current source 16 in FIG. 2 is stabilized with a negative feedback and that the capacity of VC' to supply current is improved, where the capacitor 105 is used for phase compensation.

From the above-mentioned construction of the embodiments, the following effects can be expected.

1. Temperature compensation of the light measuring circuit can be expected, which compensation is unrelated to the temperature coefficient of the resistors.
2. The reference voltage which is proportional to the absolute temperature can also be used for the temperature compensation of the coil and so on.
3. A part of the regulator circuit which is stable over temperature is used to produce a reference voltage, proportional to the absolute temperature, so that a size increase of the circuit can be avoided and so on.

Thus, the circuit according to the present invention is quite suited to monolithic integrated circuits and a guarantee of temperature independence can be expected for the whole exposure control system.

What I claim:

1. A temperature compensated exposure control circuit for a camera comprising:
   (a) a regulator including a portion for generating a first voltage having a characteristic proportional to an absolute temperature derived from differences between current densities of a pair of transistors and another portion for generating a second voltage having a negative thermal coefficient by utilizing the fact that the voltage across the base-emitter path of a transistor has a negative thermal coefficient, said regulator putting out said first voltage proportional to the absolute temperature and a voltage of very small thermal coefficient by adding said first voltage and said second voltage;
   (b) a photosensitive element;
   (c) operational amplifier means for amplifying the output of said photosensitive element;
   (d) means for feeding back the output of said operational amplifier means to an input of said operational amplifier means, said feedback means including a first semiconductor element for compressing the output of said photosensitive element;
   (e) connection means for connecting said first voltage to a non-inverting input terminal of said operational amplifier; and
   (f) a second semiconductor element for expanding the output of said operational amplifier.

2. A temperature compensated exposure circuit for a camera according to claim 1, further comprising:
   (a) a capacitor for storing the output of said second semiconductor, one pole of said capacitor being connected to the output of very small thermal coefficient of said regulator; and
   (b) a comparator for comparing a potential of both terminals of said capacitor with a voltage divided with a predetermined ratio of the output of very small thermal coefficient of said regulator.

3. A temperature compensated exposure control circuit for a camera according to claim 1, in which the connection means includes an amplifying circuit having an appropriate gain.

4. A temperature compensated exposure control circuit for a camera comprising:
   (a) a regulator including a portion for generating a first voltage having a characteristic proportional to an absolute temperature and another portion for generating a second voltage having a characteristic of negative thermal coefficient, said regulator producing said first voltage proportional to the absolute temperature and the combined voltage of said first voltage and said second voltage which has a very small thermal coefficient;
   (b) a photosensitive element;
   (c) operational amplifier means for amplifying the output of said photosensitive element;
   (d) means for feeding back the output of said operational amplifier means to an input of said operational amplifier means, said feedback means including a first semiconductor element for compressing the output of said photosensitive element;
   (e) connection means for connecting said first voltage to a non-inverting output terminal of said operational amplifier; and
   (f) a second semiconductor element for expanding the output of said operational amplifier.

* * * * *